(12) United States Patent
Powers et al.

(10) Patent No.: US 6,403,748 B1
(45) Date of Patent: Jun. 11, 2002

(54) ENHANCING PRODUCTION OF RESIN WITHING SPECIFICATIONS

(75) Inventors: Kim Dwight Powers, Red Deer (CA); Jeff Scott Levin, Cross Lanes; Mark Louis Nelson, Charleston, both of WV (US); Jose Cavetano Jaen, Victoria, TX (US); Carlos Ray Morris, Charleston, WV (US)

(73) Assignee: Union Carbide Chemicals & Plastics Technology Corporation, Danbury, CT (US)

(*) Notice: Subject to any disclaimer, the term of this patent is extended or adjusted under 35 U.S.C. 154(b) by 0 days.

(21) Appl. No.: 09/558,730

(22) Filed: Apr. 26, 2000

(51) Int. Cl.[7] .................................................. C08F 10/14
(52) U.S. Cl. ...................... 526/348.2; 526/65; 526/67; 526/348.5; 526/348.6; 525/53; 525/54
(58) Field of Search .................... 526/65, 67, 348.2, 526/348.5, 348.6; 525/53, 54

(56) References Cited

U.S. PATENT DOCUMENTS

| | | | | |
|---|---|---|---|---|
| 4,128,343 A | * | 12/1978 | Moked et al. | 366/101 |
| 4,285,602 A | * | 8/1981 | Hagerty et al. | 366/177 |
| 4,560,285 A | | 12/1985 | Fisher | 366/341 |
| 5,089,571 A | | 2/1992 | Bonk et al. | 525/457 |
| 5,363,754 A | * | 11/1994 | Coles et al. | 99/484 |
| 5,627,346 A | | 5/1997 | Weibel et al. | 177/64 |

* cited by examiner

*Primary Examiner*—David W. Wu
*Assistant Examiner*—William K Cheung (57) ABSTRACT

A set of trim forward bins is utilized to set aside, distribute and allocate portions of granular product made in a continuous, usually fluidized bed, olefin polymerization reactor, to form blends which more efficiently utilize the products made during transitions from one set of specifications to another and/or to maintain a target property substantially continuously during steady state production of a single product.

23 Claims, 6 Drawing Sheets

ENHANCING PRODUCTION OF RESIN WITHING SPECIFICATIONS

TECHNICAL FIELD

This invention relates to optimizing properties of polymeric resins, particularly polyolefins, made in continuous production runs, including transitions from the manufacture of one polymer product to another. It includes methods and apparatus for utilizing maximum amounts of products having properties which vary within and/or outside a set of specifications.

BACKGROUND OF THE INVENTION

In many polymer manufacturing processes, off-grade resin may be produced when transitioning from one resin grade to another and even during steady state operation. This problem is especially noticeable in a gas phase polymerization because the large fluidized bed polymerization reactor behaves like a continuously stirred tank reactor. Once the reactor conditions are changed for the new grade of resin in a gas phase reactor, it may be necessary to produce as much as three times the bed weight of the resin before the new resin properties achieve an acceptable steady state. Because the product properties change slowly in large volume reactors, and depending on the similarities and differences between the two products, it is not uncommon for up to 15% of the total resin made in a reactor campaign to be off grade (out of specification in at least one respect), mainly due to the product made during the transition from one set of specifications to another. The resin produced during such transitions is usually sold at a significantly lower price than the resin that meets the specifications (sometimes called AIM grade resin herein). It is desirable to reduce the amount of off-grade resin made during transition periods between sets of specifications and at any other time.

In gas phase polymerization operations, it is common to pellet the off grade granular resin and then recycle these off grade pellets back into the pelleter at concentrations which will not cause deviation from specifications in AIM grade production. Repeated pelleting can impart an undesirable thermal history, and the additive content of the product must be continually recalculated and adjusted. In addition, the pelleter capacity is underutilized because a significant portion of the granular product is run through the pelleter more than once. Recycling pellets to the pelleter is undesirable.

Another problem in a gas phase polymerization line is the provision of adequate surge capacity between the reactor and pelleter. Adequate surge capacity is important to allow common pelleter problems to be fixed without having to kill or upset the reactor, which normally produces product more or less continuously. Sudden kills or upsets in the reactor due to the inability of the pelleter to handle the particulate product can result in off grade resin and lengthy restart procedures. In the present state of the art, the purge bin located between the reactor and the pelleter is frequently designed larger than required for simple purging in order to allow extra surge time for the pelleter.

Also in continuous polymerization production, as in a fluidized bed, it is common for one or more properties to vary from a target point but remain within a specification range. While virtually all consumers and users of resin want product within specifications needed for their particular purposes, many also are concerned with the consistency of specified values. Thus the products must not merely be within a specified range of values for one or more properties, but must consistently, from run to run, and from the beginning to the end of a run, be on, or very near to, the target value or target values for one or more properties. Producing final products having reduced variability will increase the process capability limit (CpK) of the process. Persons skilled in the art will realize that a change in a control (set) point to adjust one product property will affect the process in other ways, and that process adjustments of any kind may affect product consistency in more than one manner. Ideally, in spite of the complexity of the process, one will want to produce a product which is consistently on target in all respects.

It would be desirable to alleviate the necessity for excessively large purge bins, to develop a method for minimizing off-grade production, to reduce or eliminate the practice of recycling through the pelleter, and to produce a specification product which is consistently on target for various properties.

Our invention, will be discussed and described with particular reference to the widely used "Unipol" fluidized bed process for olefin polymerization. See, for example, the descriptions in Bernier et al U.S. Pat. No. 5,453,471, Miller U.S. Pat. No. 4,003,712, Aronson U.S. Pat. No. 4,621,952, and other related patents of Union Carbide Corporation. The applicability and value of the invention is not limited to the Unipol process, however; it may be used in any resin producing facility which makes particulate (sometimes herein used interchangeably with "granular") product more or less continuously whether or not it is to be pelletized.

SUMMARY OF THE INVENTION

This invention provides a method for trimming, or blending, off grade granular material into AIM grade material while keeping the AIM grade material within specifications. The value of the invention is particularly high when trimming granular transition off grade into the leading and trailing products of a transition to reduce the total off grade product. The invention also provides a method for consistently producing resin which is not only within specification ranges but on target or very close to target for desired properties.

The apparatus used in this invention is a set of one or more bins, referred to herein as trim forward bins, located between the reactor and the pelleter, preferably after a purge bin. Resin from the reactor can be transferred to any of the trim forward bins, or be sent to a purge bin, or directly to the pelleter. Our invention, however, concerns the use of the trim bin or bins. Resin can be combined from any of the trim bins before it is sent to the pelleter. The system may comprise any number of bins and the bins may be of any size. An optimum number of bins and the size of the bins can be determined based on the anticipated product cycle of the reactor. Preferably the trim forward bins will be of a design or construction as to provide "plug flow", meaning that the bin delivers granular material substantially in the sequence in which it was received. The interface between two somewhat different granular materials is substantially conical if the granular material enters at the center of the top of the bin and falls onto a bed of granular material already present. A conical interface between products of somewhat different characteristics, as between on-specification and off-specification polyethylene granules, will remain substantially conical as it descends in the bin. Gravity discharge from the center of the bottom of such a bin assures a substantially clear passage from one type of product to another, although there may be some mixing at the interface when it is first formed and as it emerges from the bottom of the bin. Sometimes "plug flow" in this context is used interchangeably with "mass flow", and that is our intention in this description. The downward progress of an interface or boundary of two different types of granular products may be calculated and/or projected as discharge from the bin is monitored, and we utilize this fact in our invention. We do not intend to rule out the use of other types of trim bins, however, i.e. ones which may more significantly blur the boundary between one product and another, as there may be instances in the use of our invention where such a blurring will be well defined and/or of little consequence, and the progress of a blurred interface may be followed as well as a sharply delineated one.

Our process includes a method of enhancing the production of a first pelletized resin product having a first set of specifications made as granules in a substantially continuously operating reactor during a campaign including the scheduling of a second pelletized resin product having at least one specification of a value different from that of the first pelletized resin product comprising (a) optionally passing granules having the first set of specifications from the reactor directly through a conduit or through a trim bin to a pelleter, (b) collecting granules from the reactor having the first set of specifications in a trim forward bin, (c) changing the conditions of the reactor from conditions for manufacturing granules having the first set of specifications to new conditions for manufacturing granules to be pelletized as the second pelletized resin product (d) passing granules made under the new conditions in the reactor through a conduit to the pelleter and (e) blending granules from the trim forward bin into the granules made under the new conditions, in the conduit. It should be understood that, where product is not to be pelletized, that is, where it will be sold in granular form, the process is the same except that the destination is a holding bin or shipping container rather than a pelleter.

Additionally, our process contemplates controlling the ratio of blending in step (e) to optimize the utilization of granules made under the new conditions which are outside of specifications for either the original product or the new product. We also contemplate controlling the quantity of granular product collected in step (b) as a function of the anticipated production of off-grade granules between steady state production of the first and second products. And, our process also contemplates the utilization of more than one trim forward bin for the collection of granules having different properties for versatile calculation of blends. Additionally, our process contemplates the placing of granules of one set of specifications on top of granules of another set of specifications in the same trim forward bin, and monitoring the downward progress of the interface between the two quantities of granules as the bin is emptied, to facilitate the desired blending steps.

In another aspect, our process is a method of operating a resin manufacturing process to optimize the amount of product produced within specifications when converting from the production of a first specification product having a first set of specifications to the production of a second specification product having a second set of specifications wherein a reactor produces transition products which are sequentially (a) a first transition product which is blendable into the first specification product to obtain a first blended product within specifications (b) a second transition product which is not blendable into either the first or the second specification product to obtain a product within specifications, and (c) a third transition product which is blendable into the second specification product to obtain a product within specifications, the method comprising: (1) placing a quantity of the first specification product into a first trim bin, (2) blending the first particulate product from the first trim bin into the first transition product (a) as the first transition product (a) is forwarded to a pelleter, (3) placing the second transition product in either the first trim bin or a second trim bin (4) placing the third transition product in either the first trim bin, the second trim bin, or a third trim bin, and (5) blending the third transition product with the second specification product as it is forwarded to a pelleter.

In another aspect, our invention may be used in the situation where, in the above summary, the transition product (b) which is not blendable into either the first or second specification product is not made. That is, because of the peculiarities of the specifications of both products, only intermediate products (a) and (c) are made. In this case, the "third transition products" in steps (4) and (5) may be replaced by a second transition product, which is in this case blendable.

It is also possible to have only one intermediate product. For example, the first specification product may contain a small amount of a comonomer and the second specification product is otherwise similar but does not have the comonomer. So long as the intermediate product contains comonomer, it may be blendable (in various proportions depending on the monomer content) in the first specification product. In another variation, the specifications and/or product property values may be such that an intermediate product may be blended only into the second specification product.

Our invention includes a method of making a granular resin product having a target value z of a property A comprising placing a first granular product having a measured or estimated value x of property A in a trim bin and blending the first granular product from said trim bin into a conduit containing a second granular product having a known or estimated value y of property A to form a third, blended, granular product having a value z of property A. In yet another aspect, our invention is a method of producing resin which is not only within a specification range for a particular property, but consistently on target for the property or within very narrow limits for the property. That is, our invention includes a method of controlling granular resin product in substantially continuous production to enhance conformity to a single set of specifications comprising (a) first placing granular product of a second set of properties on top of granules of a first set of properties in a trim forward bin to form an interface between the quantities of granular product, (b) determining the downward progress of the interface as the bin is emptied, and (c) controlling the delivery of each of the quantities of granular products to a pelleter by itself or as a blend with granular product having a third set of properties at least partly as a function of the position of the interface in the bin.

Further, our invention includes a method of operating a resin manufacturing process to optimize the amount of product produced within specifications when converting from the production of a first particulate product having a first set of specifications to the production of a second particulate product having a second set of specifications wherein a reactor produces at least one transition product which is (a) blendable into the first particulate product to obtain a product within the first set of specifications, (b) not lendable into either the first or said second particulate product to obtain a product within specifications, or (c) blendable into the second particulate product to obtain a product within the second set of specifications, the method comprising: placing a quantity of at least one of the first particulate product, transition product (a), and transition product (c) into a trim bin and blending it into a later-produced product in a ratio calculated to obtain a final product having a desired set of specifications. The desired set of specifications may be either the first or second set of specifications, and the later-produced product may be either transition product (a), into which the first product is blended, or the second particulate product, into which transition product (c) is blended. The specifications may be a single value or a range of values for a single property.

Other aspects and variations of our invention will be further described below.

DETAILED DESCRIPTION OF THE INVENTION

Our invention in one aspect deals with the conversion of a polymerization process from making a product having one set of specifications to making a product with another set of specifications. An object of our invention is to reduce or avoid altogether recycling of product through the pelleter. Another object of our invention is to maximize the use of transition product in product which is within specifications.

The process contemplates that a reactor is making a particulate (granular) product suitable for pelleting. Normally the particulate product processed according to our invention would be sent to a pelleter, but it is within our invention also that the AIM product made and segregated according to our invention can be stored or used in forms other than pellets, such as granules (particulates).

Stated another way, our trim forward process comprises the following steps:

First, accumulate a quantity of resin in one of the trim forward bins. This resin will be used as a base in which to trim other resin. Most often, this would be AIM grade resin saved before a transition or anticipated off-grade episode. The amount of resin to accumulate may be calculated based on the expected transition in order to optimize bin usage or can be arbitrarily set. Probably less frequently, the operator or automated system will first save a granular material in a trim bin where the material is out of specification in one property or another. In the first case, where the resin is within specification, it may pass directly through the trim bin to the pelleter before or after the bin is full.

Next, monitor the resin going to the trim bin (or follow a computer model) to determine whether the resin should be diverted to a different trim bin and divert resin if appropriate. In normal operation this would occur when the character of the resin changes. Three general types of resin are AIM grade, off-grade/trimmable, and off-grade/not trimmable. Where AIM grade is being made, one of the properties may have drifted from the target (set point) but is still within specification. Many methods can be used to determine the status of the resin including modeling of resin properties, and direct or indirect measurement of the progress of the resin through the system. Depending on the exact situation the resin can be diverted to an empty trim bin, to a trim bin that already has a resin in it, or sent to the pelleter.

Third, control the feeds from the various trim bins to maximize the recovery of off-grade resin. This includes determining if any of the resin at the outlet of the trim bins can be combined in the pelleter feed conduit in such a way that the resulting mix will meet desired product specifications, or if the resin should be pelleted as AIM grade or off-grade with no trim. In normal operation, anticipating a transition, AIM grade resin would be in one trim bin, off grade would be in another, and the maximum amount of off grade resin would be added to the AIM grade while keeping the resin in specification. Or, an on-specification resin having a single property off target may be separated. The properties at the bottom of the bins can be estimated using models, or measured directly or indirectly. The resulting property of the mixture of the resins can be estimated using models, rules of thumb, or measurements.

Controlling the feed from the trim bins may be accomplished by controlling valves, pumps, rotary feeders, and the like to achieve a fall range of proportions or ratios of two or more products to each other.

Where the composition varying within a run is to be maintained, the target point for a property may be modulated. That is, the set point will be deliberately moved from the specification value for a time to make product destined for blending with product having a specification value off-target in the opposite direction.

EXAMPLE 1

Using Off-Grade Resin

Figure 1:
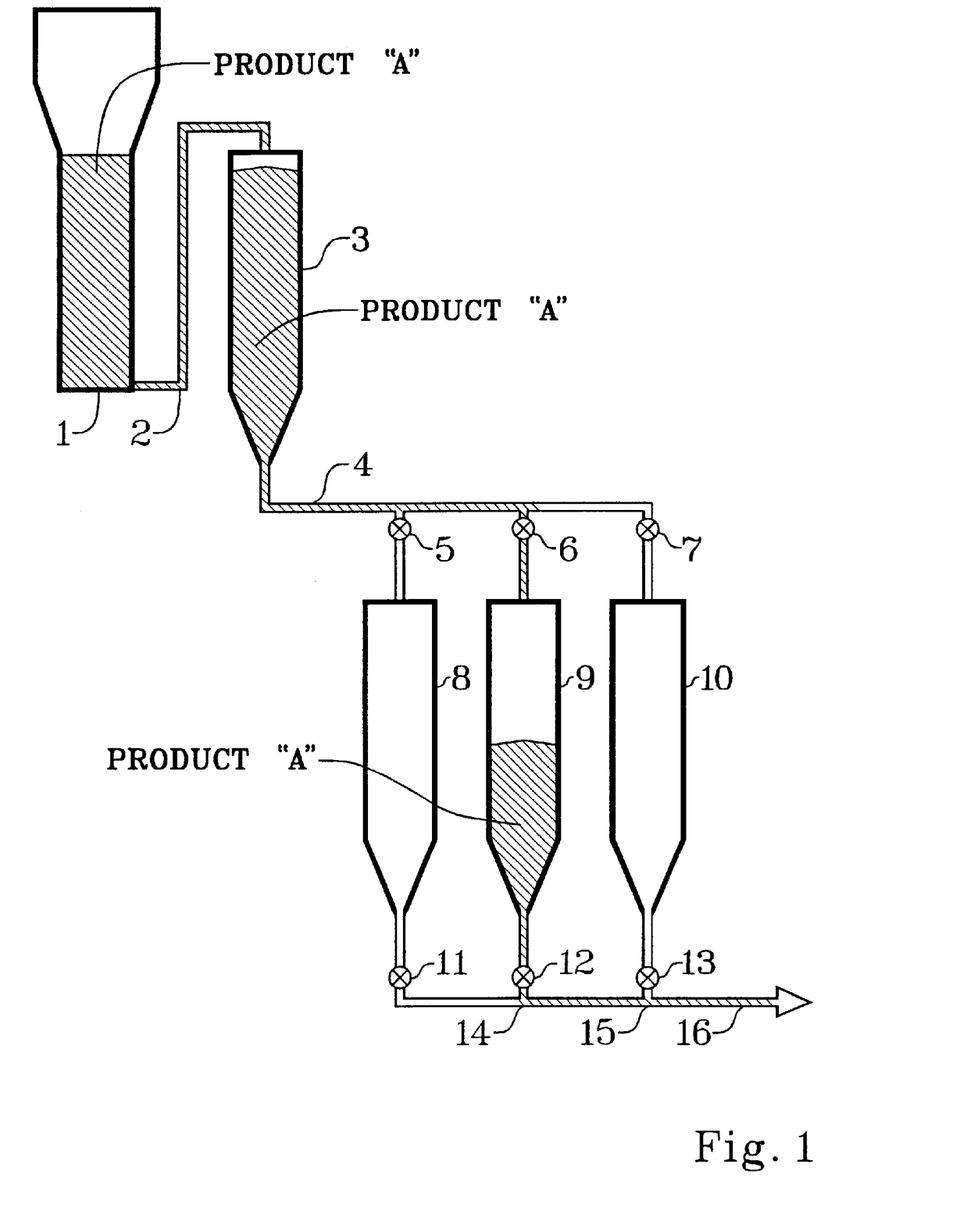
FIG. 1 is a more or less diagrammatic depiction or flowsheet of the first step in our process, showing the building of inventory of a first product within specifications, in anticipation of blending with transition product to be made.

A simulator was used to generate the following information pertaining to a product transition. A 75,000 pound per hour polyethylene gas phase reactor was postulated to produce polyethylene resin. Referring to FIG. 1, resin is transferred from the reactor 1 through line 2 to a 165,000 pound purge bin 3 for purging liquid and/or gaseous hydrocarbon from the granular resin product, using purge devices and gas sources not shown. The purge bin 3 may be used for simple storage or conventionally to purge the product of liquid or gas. The resin is then transferred from the purge bin 3 through line 4 and valves, 5, 6, and/or 7 to any one of three 300,000 pound trim bins 8, 9, or 10. Resin from any combination of the three trim bins can be combined in a conduit 16 through the manipulation of valves 11, 12, or 13 for sending to an end point. Valves 11, 12, and 13 may be rotary feeders, for example, and may be controlled to rotate at varying speeds to vary the proportions of the granular product taken from the trim bins 8, 9, or 10. The end point destination of line 16 may be a storage or packaging facility, an injection or other molding facility, or, more commonly, a pelleter.

The reactor is postulated to transition from manufacturing a polyethylene resin ("Product A") with a flow index ("FI") of 70 and a density of 0.96125 gm/cc to a resin with a flow index of 27 and a density of 0.9455 gm/cc ("Product B"). Product A has an AIM grade specification of 70±4 for FI and 0.963–0.9595 gm/cc for density. Also, in order to assure that the product properties are acceptable a blending limit has been set such that no resin with a FI below 58 or above 79 or a density below 0.9555 gm/cc or above 0.967 gm/cc can be blended into the AIM grade Product A at any level. When blending resin into Product A, the set point target for the blend will be within the specification limits to allow for error, and are 72–68 (70±2) for FI and 0.9621–0.9604 (0.96125±0.00085) gm/cc for density. Similarly, the AIM grade limits for Product B are 32–22 (27±5) for FI and 0.9475–0.9435 gm/cc for density, the blend limits are 37–17 for FI and 0.9515–0.9395 gm/cc for density, and the blend targets are 27±2.5 for FI and 0.9465–0.9445 gm/cc for density.

Figure 2:
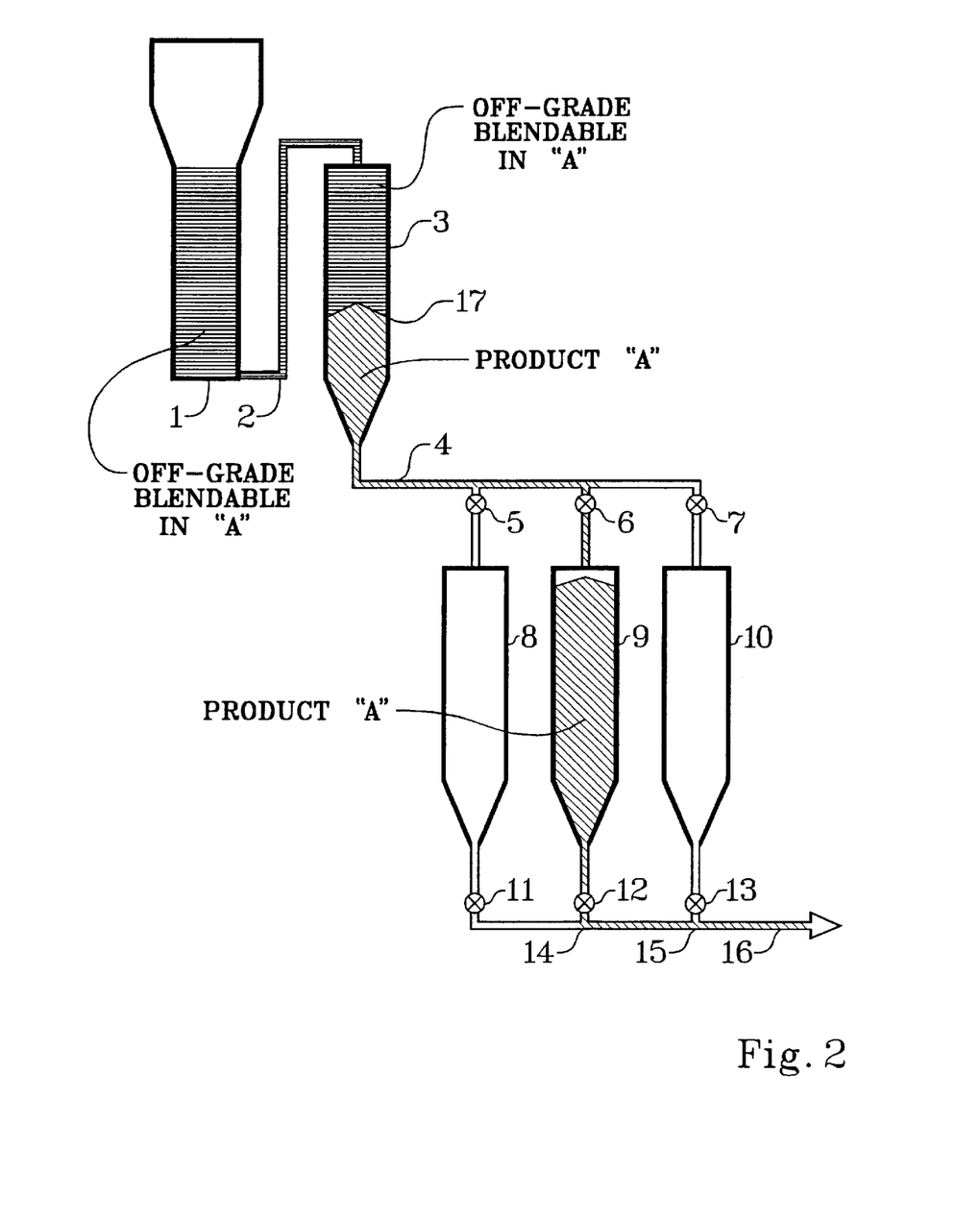
FIG. 2 illustrates the next step in the sequence after that of FIG. 1, wherein the reactor begins to produce material that is off grade but blendable with the first product.

The first step in the trim forward process is to accumulate resin in one of the trim bins. This is begun in FIG. 1, which shows product A in reactor 1 and purge bin 3, and delivered from purge bin 3 through line 4 to trim bin 9. A calculation was used to estimate that about 300,000 pounds of AIM grade Product A would be required to blend the off grade resin produced during the first part of the transition. In anticipation of the transition, the level of resin in trim bin 9 is raised to 300,000 pounds of Product A, as seen in FIG. 2. Next, the reactor conditions are adjusted to those required to make Product B, increasing the ratio of hexene to ethylene, decreasing the temperature, and decreasing the oxygen content in the reactor. A transition product then begins to appear in the reactor 1 and line 2 leading to the purge bin 3. Note that the resin in line 16, leading to the pelleter, still delivers only Product A from trim bin 9 at this point.

Figure 3:
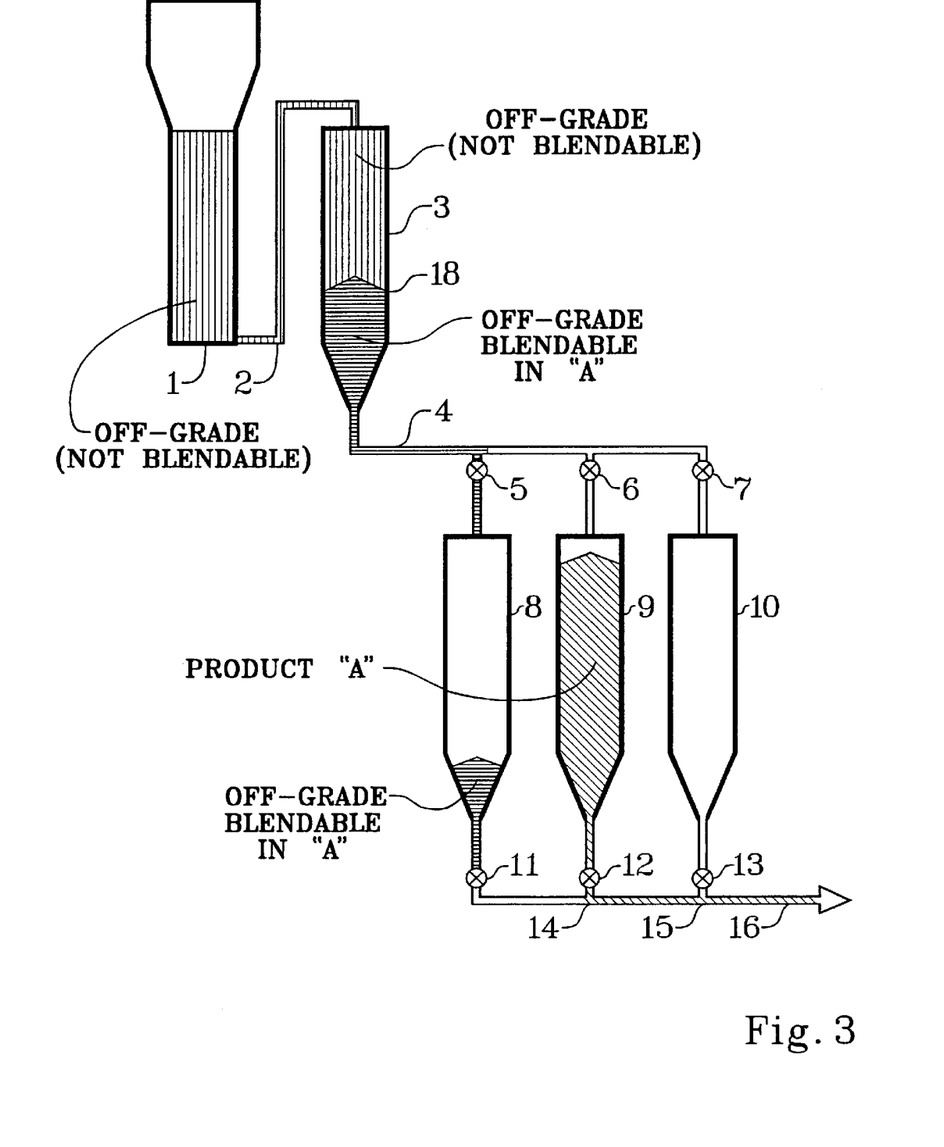
In FIG. 3, the blendable resin is diverted to a different bin, while the reactor begins to make material not blendable in either the first or second specification product.

Four hours after the transition started in reactor 1, the FI goes out of specification in the reactor 1 and the status of the resin emerging from the reactor 1 changes from AIM grade to off grade/trimmable. See FIG. 2, showing the off-grade material in reactor 1, line 2, and the top portion of purge bin 3. This resin is considered trimmable because the FI and density is within the blend limits of Product A. The system continues to fill purge bin 3 and deliver Product A from bin 9 until the trimmable resin reaches the bottom of purge bin 3. As seen in FIG. 2, the progress of interface 17 is followed to determine when it reaches the bottom of purge bin 3, and material from purge bin 3 is then, at about 6 hours into the transition, diverted to trim bin 8, while the trim bin 9 remains full of Product "A". As seen in FIG. 3, meanwhile, reactor 1 has been producing off-grade (not trimmable) material, which is on top of interface 18 and in reactor 1 and line 2. In order to determine when the resin with the new status (not blendable) has reached the bottom of purge bin 3, the resin profile in the purge bin (as well as the trim forward bins) has been modeled. The models are based on a material balance around the entire reaction and pelleting system, and rely on weight cell measurements from the purge and trim bins. The models within a bin take into account both plug flow and mixing zones. The inputs to the model are the production rate from the reactor and the calculated bed average resin properties from the reactor. As laboratory values become available the models are updated.

Figure 4:
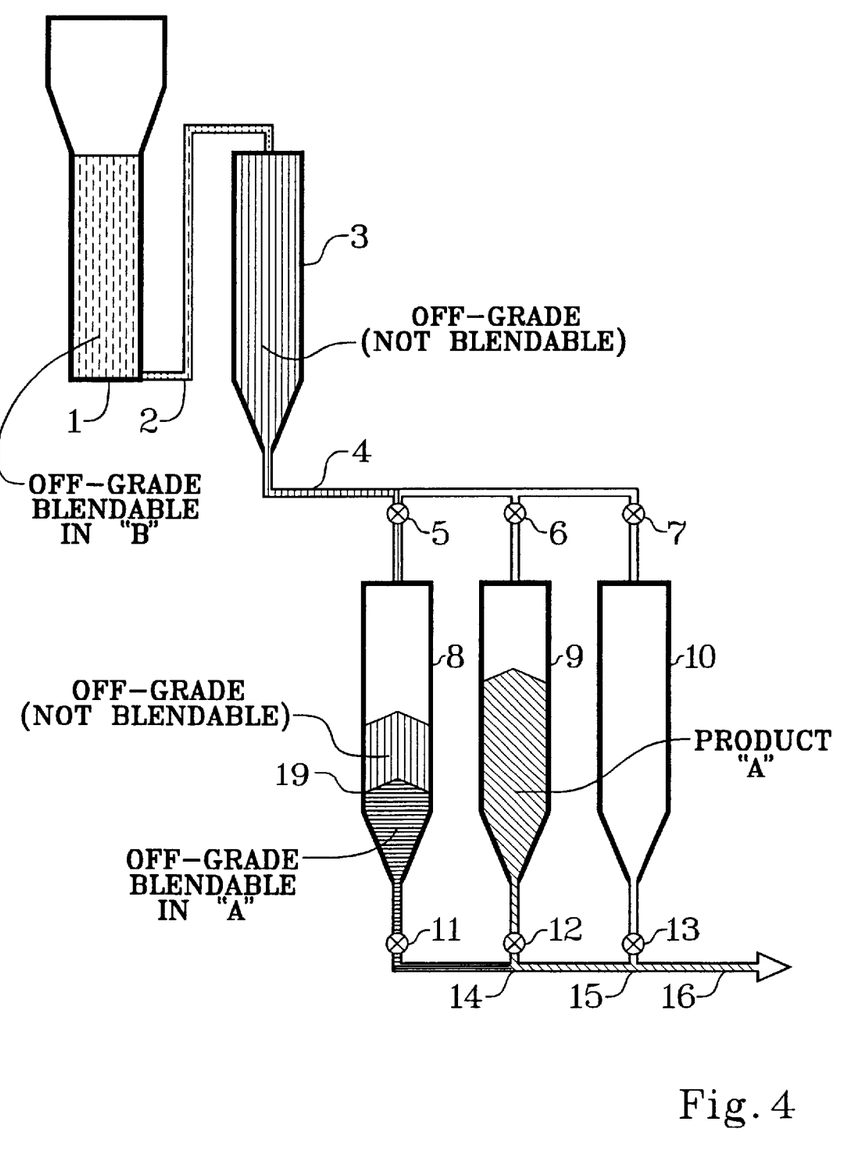
FIG. 4 shows the placement of the product which is not blendable to achieve a specified product, into a bin on top of a lendable product.
Figure 5:
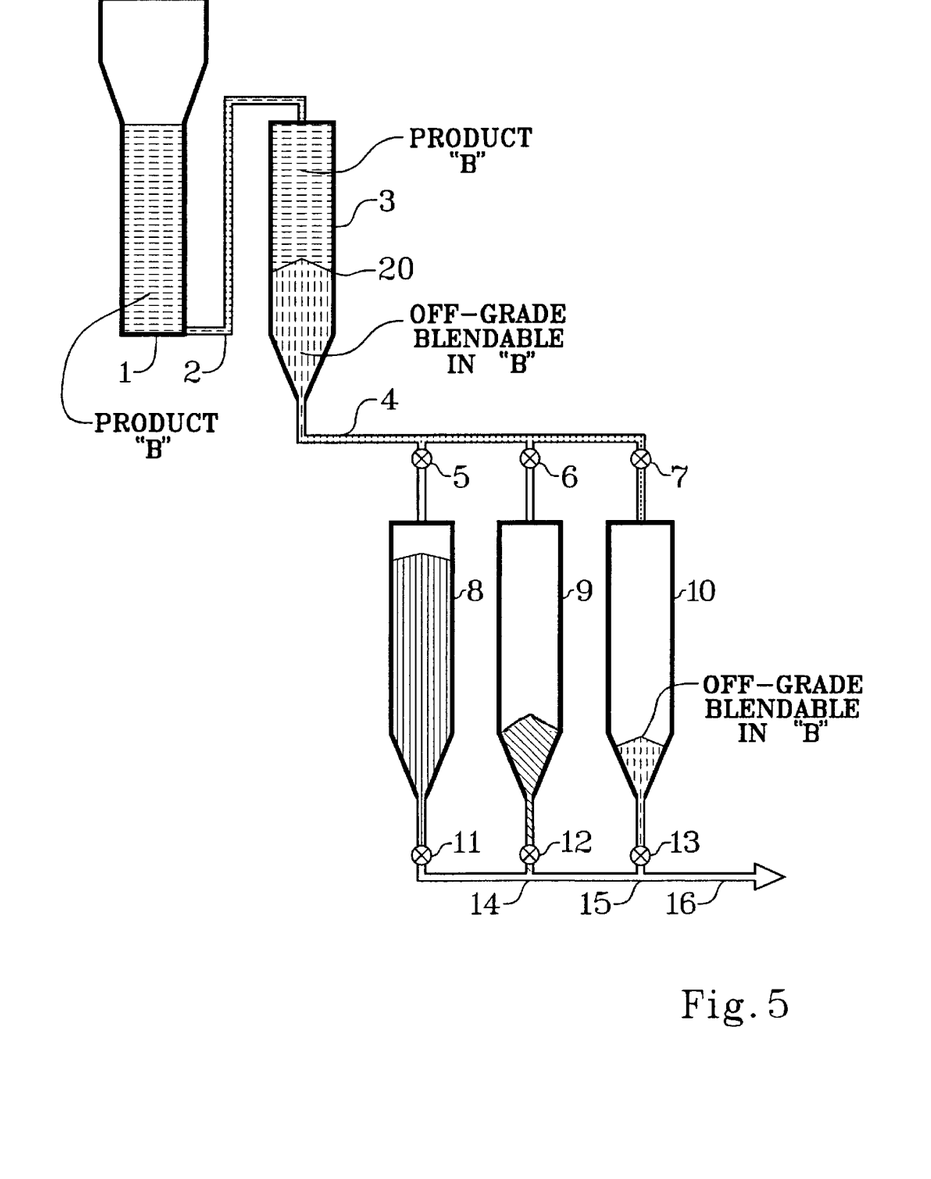
FIG. 5 shows the distribution of materials when the reactor begins production of Product "B".
Figure 6:
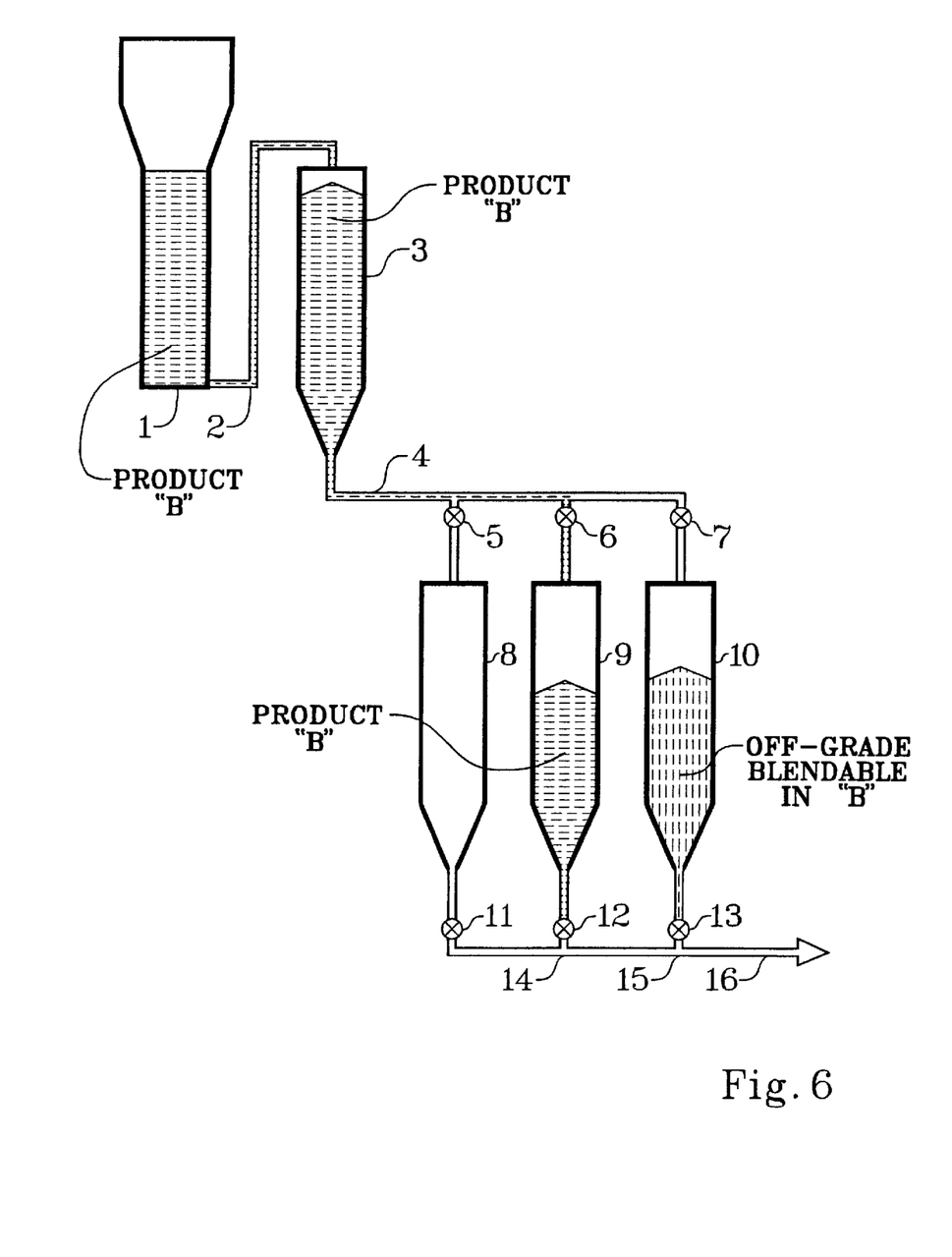
FIG. 6 illustrates the final disposition of the resin products after the sequence of FIGS. 1–5.

At 6.75 hours into the run, this resin is at the bottom of the purge bin 3 but the resin continues to be diverted to trim bin 8, above interface 19, as seen in FIG. 4, to conserve bin space. At 7.25 hours into the transition the FI and density have both dropped within the blend limits for Product B and the status of the resin changes to off grade/trimmable. When this resin gets to the bottom of the purge bin 3 delivery is diverted to trim bin 10, as seen in FIG. 5. At 9.85 hours into the transition the reactor is now AIM grade on Product B. When this resin gets to the bottom of the purge bin 3 it is diverted to trim bin 9 which has been empty (see FIG. 6).

Reverting now to FIG. 4, once the off grade trimmable resin is transferred to trim bin 8 (at about 6 hours into the transition) the trim forward controller determines if the material at the outlet of the bins can be combined to make specification resin. At this time there is AIM grade resin at the bottom of trim bin 9 and off grade trimmable resin in the bottom of trim bin 8 so the controller adjusts the feeds from bin 8 and bin 9 in order to maximize the amount of resin used from bin 8 while not allowing any of the monitored resin properties to go outside of the blend target limits. This blending continues until all of the off grade/not trimmable resin has been consumed.

As shown in FIG. 5, about 9.45 hours into the transition, there is off grade/not trimmable resin at the bottom of trim bin 8, and a small amount of AIM grade Product A material at the bottom of bin 9. The trim forward controller will then pellet the remaining Product A from bin 9 until it is used up. Now (about 10.1 hours into the transition) there is off grade/not trimmable resin at the bottom of trim bin 8 and off grade/not trimmable resin at the bottom of trim bin 10. Because there is no way to mix these resins together to make in specification resin, the trim forward system will pellet all of the off grade/not trimmable material in bin 8 as non recoverable off grade. At this point (12.75 hours into the transition) there is AIM grade Product B in trim bin 9 and off grade/trimmable resin in trim bin 10. See FIG. 6. The trim forward system will continue to blend the off grade/ trimmable material in the AIM grade product B until it is completely used up.

To summarize the transition, 443,000 pounds of off grade resin was produced on the reactor. Using the trim forward system, 246,000 pounds of resin were recovered. It should be noted that this was a particularly difficult transition and that much higher amounts of resin can be recovered on smaller transitions. Simulation has shown that for a standard product wheel typical for one reactor in the industry 70% of the off grade resin from transitions can be recovered.

EXAMPLE 2

Trim Forward to Reduce Variability

As indicated above, our invention enables one to produce more consistent resin during steady state operation, thus reducing the resin property standard deviation of the final pellets and increasing the process capability limit (CpK) of the process. In our process, we combine materials from trim bins in such a way as to achieve the target value in the product consistently.

In this simulated example, the objective was to produce resin having a Flow Index (FI) as close as possible to 25, and within a product specification of 22 to 28. When the reactor was running close to 25 a quantity of resin was collected in trim bin "A" to be used for capacity and trimming. During the course of the run while trying to control the FI at 25, the FI rose to 27 for 3 hours due to a disturbance. When this resin reached the trim bins it was diverted to a separate bin for high FI product, trim Bin "B", while the resin to the pelleter continued to come off trim bin "A". An adjustment was made to the process to lower the FI but it dropped below the AIM grade to 23 for the next three hours. This resin was diverted to a different trim bin "C". The resin from bin "B" and bin "C" were then blended together to make a resin at the AIM value of 25.

To quantify the reactor variability where trimming is used versus where trimming is not used, assume a run of three hours with a FI of 25, then three hours with a FI of 27 and then three hours with a FI of 22. Based on 30 minute samples the standard deviation from the reactor would be 1.68; this would also be the standard deviation for the pellets. Using our trimming method, the standard deviation of the pellets would be zero. In both cases, all resin produced was within specification, but where trimming was used, the variability of the pellets was significantly reduced.

In a variant of our invention, we may intentionally move the set point on the reactor for the resin property in question to make resin that is not on target, for a period of time calculated to make material sufficient to average with material which has been stored in a trim bin. More complex variants include placing the set point on a time cycle, and adjusting the frequency and amplitude of the change in set point based on current and projected inventory of resin in the trim bins.

Our invention includes the use of more than two trim bins, more than three trim bins, and variations in the proportions of the blended materials to utilize materials from any or all of the trim bins at the same time.

What is claimed is:

1. Method of enhancing the production of a first granular resin product having a first set of properties, said first granular resin product being made in a substantially continuously operating reactor during a campaign including the scheduling of a second granular resin product having at least one property of a value different from that of said first granular resin product comprising (a) optionally passing granular resin product having said first set of properties from said reactor through a conduit or a trim bin, (b) collecting granular resin product from said reactor having said first set of properties in a trim forward bin, (c) changing the conditions of said reactor from conditions for manufacturing granular resin product having said first set of properties to new conditions for manufacturing said second granular resin product, (d) passing granular resin product made using said new conditions in said reactor through said conduit and (e) blending granular resin product from said trim forward bin into said conduit while performing step (d).

2. Method of claim 1 wherein said first and second granular resin products having different specifications, including controlling the ratio of blending in step (e) to optimize the utilization of granules made under said new conditions which are outside of specifications for either said first product or said second product.

3. Method of claim 1 including controlling the amount of granular product collected in step (b) as a function of the anticipated production of off-grade granular product between steady state production of said first and second products.

4. Method of claim 1 including collecting granular product having different properties in more than one trim forward bin.

5. Method of claim 1 including the further steps of collecting granular product made under said new conditions in a trim forward bin, and blending said granular product made under said new conditions into said second granular product.

6. Method of claim 1 wherein the granular product of steps (a) and (d) is fed to a pelleter.

7. Method of claim 1 including placing granular product of one set of specifications or properties on top of granular product of another set of specifications or properties in the same trim forward bin, and monitoring the downward progress of the interface between the two quantities of granules as the bin is emptied, to facilitate a desired blending step.

8. Method of controlling granular resin product in substantially continuous production to enhance conformity to a single set of specifications comprising (a) first placing granular product of a second set of properties on top of granules of a first set of properties in a trim bin to form an interface between said quantities of granular product, (b) determining the downward progress of said interface as said trim bin is emptied, and (c) controlling the delivery of each of said quantities of said granular products from said trim bin to a pelleter by itself or as a blend with granular product having a third set of properties at least partly as a function of the position of said interface in said trim bin.

9. Method of claim 8 wherein said downward progress of said interface is determined at least partly by measuring flow of granular product from said trim bin and comparing said measured flow to a predetermined model of said flow.

10. Method of claim 8 wherein said first and second granular products are within said single set of specifications.

11. Method of claim 8 wherein the granular product delivered to said pelleter substantially continuously has at least one property of a value which is at or near a target value.

12. Method of claim 11 wherein at least one or said first, second or third set of properties includes at least one property value which is outside of said set of specifications.

13. Method of claim 8 wherein said trim bin is a plug flow trim bin.

14. Method of operating a resin manufacturing process to optimize the amount of product produced within specifications when converting from the production of a first particulate product to the production of a second particulate product wherein a reactor products transition products which are (a) blendable into said first particulate product to obtain d product within specification (b) not blendable into either said first or said second particulate product to obtain a product within specifications, and (c) blendable into said second particulate product to obtain a product within specifications, said method comprising: (1) placing a quantity of said first particulate product into a first trim bin, (2) blending said first particulate product from said first trim bin into said first transition product (a), (3) placing at least a portion of said transition product (b) in either said first trim bin or a second trim bin (4) placing said transition product (c) in either said first trim bin, said second trim bin, or a third trim bin, and (5) blending said blendable transition product (c) with said second particulate product.

15. Method of claim 14 wherein said first and said blendable transition products are forwarded to a pelleter.

16. Method of making a granular resin product having a target value z of a property A comprising placing a first granular product having a measured or estimated value x of property A in a trim bin and blending said first granular product from said trim bin into a conduit containing a second granular product having a known or estimated value y or property A to form a third, blended, granular product having a value z of property A.

17. Method of claim 16 wherein said trim bin is a plug flow trim bin.

18. Method of controlling granular resin product in substantially continuous production to enhance conformity to a target value of at least one property comprising placing a first granular resin product having a first value for said property in a trim bin, and controlling the delivery of said first granular resin product to a pelleter while blending it with a second granular resin product having a second value for said property in a ratio to maintain said property in the resulting blended product at or near a target value.

19. Method of claim 18 wherein said trim bin is a plug flow trim bin.

20. Method of operating a resin manufacturing process to optimize die amount of product produced within specifications when converting from the production of a first particulate product having a first set of specifications to the production of a second particulate product having a second set of specifications wherein a reactor produces at least one transition product which is (a) blendable into said first particulate product to obtain a product within said first set of specifications, (b) not blendable into either said first or said second particulate product to obtain a product within specifications, or (c) blendable into said second particulate product to obtain a product within said second set of specifications, said method comprising: placing a quantity of at least one of said first particulate product, said transition product (a) and said transition product (c) into a trim bin and blending it into a later-produced product in a ratio calculated to obtain a final product having a desired set of specifications.

21. Method of claim 20 wherein said final product is within said first set of specifications and said first particulate product is placed in said trim bin and blended into said transition product (a).

22. Method of claim 20 wherein said final product is within said second set of specifications, said later-produced product is said second particulate product, and said transition product (c) is blended into said second particulate product.

23. Method of claim 20 wherein said trim bin is a plug flow trim bin.

* * * * *